United States Patent
Gonzalez-Martin et al.

[11] Patent Number: 6,136,186
[45] Date of Patent: Oct. 24, 2000

[54] PHOTOCATALYTIC OXIDATION OF ORGANICS USING A POROUS TITANIUM DIOXIDE MEMBRANE AND AN EFFICIENT OXIDANT

[75] Inventors: Anuncia Gonzalez-Martin, San Jose, Calif.; Oliver J. Murphy; Carlos Salinas, both of Bryan, Tex.

[73] Assignee: Lynntech, Inc., College Station, Tex.

[21] Appl. No.: 09/115,358

[22] Filed: Jul. 14, 1998

Related U.S. Application Data

[63] Continuation-in-part of application No. 08/791,599, Jan. 31, 1997, Pat. No. 5,779,912.

[51] Int. Cl.$^7$ .............................. C02F 1/32; B01J 19/08
[52] U.S. Cl. ..................... 210/198.1; 210/201; 210/205; 210/908; 422/186.3
[58] Field of Search .................... 210/748, 749, 210/758–760, 763, 198.1, 205, 209, 195.1, 201, 908; 422/24, 186, 186.3; 204/157.15, 152.3

[56] References Cited

U.S. PATENT DOCUMENTS

| | | |
|---|---|---|
| 4,240,882 | 12/1980 | Ang et al. . |
| 4,544,470 | 10/1985 | Hetrick . |
| 4,684,537 | 8/1987 | Graetzel . |
| 4,694,179 | 9/1987 | Lew et al. . |
| 4,792,407 | 12/1988 | Zeff . |
| 4,836,929 | 6/1989 | Baumann . |
| 4,849,114 | 7/1989 | Zeff . |
| 4,867,052 | 9/1989 | Cipelletti . |
| 4,888,101 | 12/1989 | Cooper . |
| 4,892,712 | 1/1990 | Robertson . |
| 4,954,465 | 9/1990 | Kawashima et al. . |
| 4,997,576 | 3/1991 | Heller . |
| 5,035,784 | 7/1991 | Anderson et al. . |
| 5,045,288 | 9/1991 | Raupp et al. . |
| 5,126,111 | 6/1992 | Al-Ekabi . |
| 5,137,607 | 8/1992 | Anderson . |
| 5,256,379 | 10/1993 | DeLoach . |
| 5,259,962 | 11/1993 | Later . |
| 5,266,215 | 11/1993 | Engelhard . |
| 5,288,461 | 2/1994 | Gray . |

(List continued on next page.)

OTHER PUBLICATIONS

Ronald L. Cook and Anthony F. Sammells, Ambient Temperature Methane Activation to Condensed Species Under Cathodic Conditions, pp. 2007–2008, Jun. 6, 1990.

Annucia Gonzalez–Martin, Destruction of Chemical Warfare Agents by Enhanced Photocatalytic Reactors at Semiconductor Ceramic Membranes, pp. 4–68.

Annucia Gonzalez–Martin, Mineralization of Explosive Pollutants in Aqueous Streams by a Novel Advanced Oxidation Photocatalytic Process, p. 3–25.

Characterization of Semiconductor Materials, p. 660–664.

Annucia Gonzalez–Martin, Destruction of Chemical Warfare Agents by Enhanced Photocatalytic Reactions at Semiconductor Ceramic Membranes, p. 3–25.

*Primary Examiner*—David A. Simmons
*Assistant Examiner*—Fred Prince
*Attorney, Agent, or Firm*—Streets & Steele; Jeffrey L. Streets

[57] ABSTRACT

A method and apparatus for mineralizing organic contaminants in water or air provides photochemical oxidation in a two-phase or three-phase boundary system formed in the pores of a $TiO_2$ membrane in a photocatalytic reactor. In the three-phase system, gaseous (liquid) oxidant, liquid (gaseous) contaminant, and solid semiconductor photocatalyst meet and engage in an efficient oxidation reaction. The porous membrane has pores which have a region wherein the meniscus of the liquid varies from the molecular diameter of water to that of a capillary tube resulting in a diffusion layer that is several orders of magnitude smaller than the closest known reactors. The photocatalytic reactor operates effectively at ambient temperature and low pressures. A packed-bed photoreactor using photocatalyst coated particles is also provided.

46 Claims, 9 Drawing Sheets

U.S. PATENT DOCUMENTS

| | | |
|---|---|---|
| 5,449,466 | 9/1995 | Peebles, III et al. . |
| 5,456,881 | 10/1995 | Bandel . |
| 5,460,705 | 10/1995 | Murphy . |
| 5,462,674 | 10/1995 | Butters et al. . |
| 5,501,180 | 3/1996 | Zhang . |
| 5,562,674 | 10/1996 | Furness, Jr. et al. . |
| 5,589,078 | 12/1996 | Butters et al. . |
| 5,656,242 | 8/1997 | Morrow et al. . |
| 5,689,798 | 11/1997 | Oeste . |
| 5,720,858 | 2/1998 | Noceti . |
| 5,753,106 | 5/1998 | Schenck . |
| 5,779,912 | 7/1998 | Gonzalez-Martin et al. . |
| 5,790,934 | 8/1998 | Say et al. . |
| 5,863,491 | 1/1999 | Wang . |
| 5,954,925 | 9/1999 | Sherman . |

PHOTOCATALYTIC OXIDATION OF ORGANICS USING A POROUS TITANIUM DIOXIDE MEMBRANE AND AN EFFICIENT OXIDANT

BACKGROUND OF THE INVENTION

This is a continuation-in-part application of U.S. patent application Ser. No. 08/791,599, filed Jan. 31, 1997, now U.S. Pat. No. 5,779,912.

This invention was made with Government support under contract DAAH04-95-C-0019 awarded by the Army. The Government has certain rights in this invention.

FIELD OF THE INVENTION

This invention relates to decontamination of water or air, more specifically to a photocatalytic reactor and method for oxidizing organic pollutants in contaminated water or air.

BACKGROUND OF THE RELATED ART

Several technologies have been used in the past to remove or annihilate organic contaminants found in hazardous chemical waters, wastewaters, and polluted gases. Some destructive techniques, e.g., chlorination, use strong oxidants that are themselves hazardous. On the other hand, the predominant non-destructive technologies currently in use have serious drawbacks: air stripping converts a liquid contamination problem into an air pollution problem, and carbon adsorption produces a hazardous solid which must be disposed. Thus, conventional methods for organic contaminant disposal must be replaced with procedures having minimal environmental impact.

Advanced oxidation processes (AOPs) are one example of an environmentally friendly approach for treating organic contaminants. AOPs usually involve treatment of the contaminant with ultraviolet light (UV), chemical oxidation, or both. AOPs are destructive processes in which the target organic compounds may be fully oxidized (i.e., mineralized) to relatively innocuous end products such as carbon dioxide, water, and inorganic salts. Because AOPs do not leave any residual contaminants requiring additional treatment, these processes are well suited for destruction of organic pollutants. Therefore, the development of effective AOPs is important.

Typical AOPs rely on the generation of hydroxyl radicals (OH·) to degrade organic contaminants. The rapid, non-selective reactivity of OH· radicals (one of the most reactive free radicals and strongest oxidants) allows them to act as initiators of oxidative degradation. Common AOPs such as $H_2O_2/UV$, $O_3/UV$, and $H_2O_2/O_3/UV$ involve UV photolysis of $O_3$, $H_2O_2$, or both to generate OH· radicals. In the photocatalytic oxidation, $TiO_2/UV$, a titanium dioxide semiconductor absorbs UV light and generates OH· radicals mainly from adsorbed water or OH⁻ ions. The overall process taking place in the photocatalytic mineralization of organic pollutants at a semiconductor (sc) surface can be summarized by the following reaction:

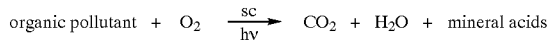
(1)

where hν represents photons with an energy equal to or higher than the band gap energy of the semiconductor.

Semiconductor photocatalysis has been used to mineralize most types of organic compounds such as alkanes, alkenes, haloalkanes, haloalkenes, aromatics, alcohols, haloaromatics, haloalcohols, acids, polymers, surfactants, nitroaromatic, dyes, pesticides, and explosives. The susceptibility of such a wide variety of compounds to treatment in this fashion, makes photocatalytic degradation a particularly attractive process for air purification and wastewater treatment.

Under illumination, electrons (e⁻) and holes (h⁺) are usually generated in the space charge region of the semiconductor as shown in the following equation:

(2)

Under proper conditions, the photoexcited electrons (in the conduction band, CB, of the semiconductor) and photoexcited holes (in the valence band, VB, of the semiconductor) can be made available for redox reactions. The photogenerated holes in the VB must be sufficiently positive to carry out the oxidation of adsorbed OH⁻ ions or $H_2O$ molecules to produce OH· radicals (the oxidative agents in the degradation of organics) according to the following reactions:

(3)

(4)

The photogenerated electron usually reacts with oxygen according to the following reaction:

(5)

In most cases, the semiconductor can undergo oxidative decomposition by the photogenerated holes. It is generally found that only n-type semiconducting oxides are photostable towards photoanodic corrosion, although such oxides usually have band gaps which absorb only UV light. Thus, a desirable semiconductor suitable for reaction 1 will be: (i) photoactive; (ii) able to use visible and/or near UV; (iii) biological or chemical inert to agents to be treated; (iv) photostable; (v) inexpensive; and (vi) able to produce OH· radicals, for example, as in, Eq. 3 & 4.

$TiO_2$ and $SrTiO_3$ satisfy the energy demand for reactions (3) or (4) and (5). Among the different semiconductors tested, $TiO_2$ is the most efficient photocatalyst for reaction (1). $TiO_2$ is effective not only in aqueous solution but also in non-aqueous solvents and in the gas phase. It is inexpensive, photostable, insoluble under most conditions, and non-toxic. Thus, $TiO_2$ has proven to be the semiconductor of choice for photomineralization of organic pollutants.

In the photocatalytic oxidation of organics in aqueous solution, it has been shown that $O_2$ reduction at the $TiO_2$ surface is the rate determining step. This limitation can be overcome by the use of a porous $TiO_2$ ceramic membrane, i.e., a "three phase" boundary system where the reactants are delivered to the reaction site as disclosed in co-pending U.S. patent application Ser. No. 08/791,599, filed Jan. 31, 1997, and incorporated by reference herein. However, enhancement of the photcatalytic reaction by assisting the oxidation/reduction reactions that take place on the $TiO_2$ surface would be highly desirable.

Another disadvantage of conventional AOPs, such as $O_3/UV$ and $H_2O_2/UV$, or their combination, is that they cannot utilize abundant solar light as the source of UV light because the required UV energy for the photolysis of the oxidizer is not available in the solar spectrum. Furthermore, some AOPs are efficient in mineralizing organic pollutants but exhibit slow kinetics, e.g., $TiO_2/UV$ and $H_2O_2/UV$, while others exhibit much faster kinetics, but lower degree of mineralization, e.g., $O_3$/UV. Similarly, a limitation on the use of $O_3$ in water treatments is the generation and mass transfer of sufficient $O_3$ through the water to efficiently oxidize the organic contaminant.

Another type of AOP is the packed-bed photoreactor. Traditional designs of packed-bed photoreactors are based on the use of annular reactors filled with a photoreactive material such as glass particles coated with $TiO_2$. The light source is placed either in the middle of the reactor (i.e., internal illumination) or outside of the reactor (i.e., external illumination). The internal illumination reactor is more compact than the external illumination reactor. However, light intensity per unit area decreases quickly with distance from the light source because of the absorption of light by $TiO_2$ (Beer's law), but also because the farther from the light source, more active area needs to be illuminated. On the other hand, external illumination allows for the concentration of more light per unit area. However, the thickness of annular photoreactors is limited by the UV penetration due to its absorption by the $TiO_2$ photocatalyst. Thus, in annular photoreactors, the amount of photocatalyst that can be packed is limited, i.e., only the length can be varied. Therefore, in order to achieve good convection and appropriate retention times, the annular photoreactor may require the use of long tubes and long UV lamps, and the length is limited by the pressure drop the reactor can sustain. These limitations, create a system that can be very bulky.

One problem with conventional photoreactors is that the amount of dissolved oxygen (or any other oxidant) in the water is very low compared to the amount of oxygen needed to photomineralize organic molecules to $CO_2$ and water. Thus, conventional photoreactors can only be used for water polishing systems, for example, where the initial concentration of organic molecules in the water is approximately 1 ppm or less.

Therefore, there is a need for an improved AOP that provides efficient oxidation of organics in process water, contaminated ground water, polishing water systems, or polluted air. There is also a need for an AOP capable of utilizing UV light in the solar spectrum. In addition, there is a need for compact packed-bed reactors that are not limited by length and pressure requirements. It would be desirable if the process was cost effective, easy to operate, relatively fast, and capable of achieving total mineralization.

SUMMARY OF THE INVENTION

The present invention combines a porous semiconductor material on a porous substrate with UV illumination (either from solar light or a UV lamp) and an efficient oxidant, such as electrochemically generated ozone ($O_3$), hydrogen peroxide ($H_2O_2$) or oxygen ($O_2$), in a method and apparatus for oxidizing organics in water or in air. The invention includes a process and apparatus wherein efficient photocatalytic oxidation occurs in either a two-phase or three-phase boundary system formed in the pores of a $TiO_2$ membrane disposed in a photocatalytic reactor.

In a first two-phase system, a contaminated gas stream (such as air) is passed over a solid, porous semiconductor photocatalyst and a gaseous oxidant (such as ozone, oxygen or a combination thereof) is provided to the porous photocatalyst. In a second two-phase system, a contaminated water stream is passed over a solid, porous semiconductor photocatalyst and a liquid oxidant (such as aqueous hydrogen peroxide) is provided to the porous photocatalyst. In either two-phase system, the oxidant and contaminant sources are delivered over opposing sides of the porous photocatalyst and contact each other adjacent the solid UV illuminated photocatalyst surface to provide oxidation of the organic contaminants. The process and apparatus allow the use of sunlight or artificial light, such as inexpensive low power UV lamps, as the source of UV illumination directed onto the semiconductor photocatalyst surface.

In a first three-phase system, a gaseous oxidant (such as ozone, oxygen or a combination thereof), a liquid containing organic components, and a porous, solid semiconductor photocatalyst converge and engage in an efficient oxidation reaction. Similarly in a second three-phase system, a gas containing organic components, a liquid oxidant, and a porous solid semiconductor photocatalyst converge and engage in an efficient oxidation reaction. In either three-phase system, the pores of the solid semiconductor photocatalyst have a region wherein the liquid phase forms a meniscus that varies from the molecular diameter of water to that of a capillary tube resulting in a diffusion layer that is several orders of magnitude smaller than diffusion layers in the closest known reactors. Optionally, the process and apparatus may be enhanced by allowing the use of sunlight or artificial light, such as inexpensive low power UV lamps, as a source of UV illumination directed onto the semiconductor photocatalyst surface. Furthermore, generation of $OH^-$ radicals can be enhanced by photolysis of the oxidant ($O_3$ or $H_2O_2$) by using UV lamps with a broader UV spectrum that that used in conventional AOPs.

With the small diffusion layer, the oxidant within the three-phase system simultaneously functions as (i) an electron acceptor at the surface of the $TiO_2$ membrane in the photocatalytic oxidation of organic contaminants, and (ii) an oxidant to be photolyzed in the $O_3$/UV (or $H_2O_2$/UV) reaction if proper UV illumination is used (i.e., wavelengths below 300 nm, preferably between about 220 and 280 nm). The photocatalytic reactor efficiently mineralizes a variety of organic contaminants at ambient temperature and low pressures.

Another embodiment of the present invention uses a packed bed photoreactor and multiple ways to introduce the oxidant into the reactor. The reactor contains a substrate with a photocatalytic surface, a fluid cell in communication with the photocatalytic surface of the substrate, and a UV light source like that described above. The fluid cell has an ultraviolet transmission surface positioned to expose the photocatalytic surface to ultraviolet light. The substrate can be silica beads which are coated with a photocatalyst such as titanium. The beads are packed into the reactor, preferably around dividers that act as flow fields so that the fluids (contaminant and oxidant) flowing through the reactor are not only mixed but they contact the photocatalytic surfaces on the beads.

The packed bed photoreactor provides greater surface area contact with contaminants thus is able to treat larger volumes of contaminated fluid. The design is more compact than cylindrical reactors and is capable of maintaining a saturation value of oxygen (or other oxidant) throughout the reactor, which promotes greater contact between the contaminated fluid and the photoactive surface and subsequent oxidation of the contaminants.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
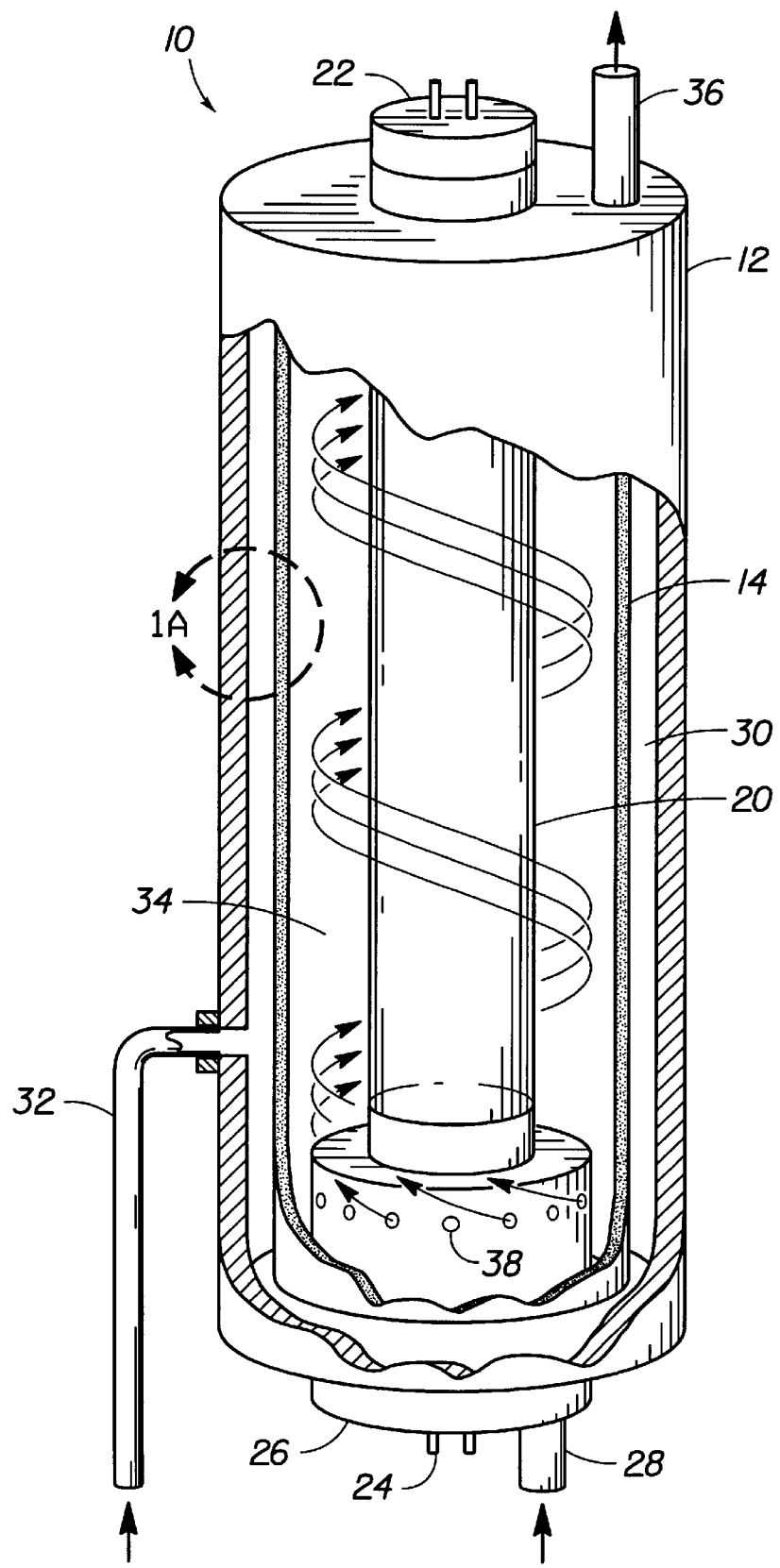
FIG. 1 is a schematic diagram of a photocatalytic reactor which combines UV light, oxidant, and a $TiO_2$ semiconductor membrane in a three-phase reaction zone to efficiently mineralize organics in water, such as process water, contaminated ground water, polishing water systems or potable water.

The present invention provides a process and apparatus for efficient photocatalytic oxidation of organic compounds in a unique two-phase or three-phase reaction zone formed in the pores of a substrate having a porous photocatalytic surface. The photocatalytic surface is preferably $TiO_2$ or a binary oxide selected from $TiO_2/SiO_2$, $TiO_2/ZrO_2$, $TiO_2/SnO_2$, $TiO_2/WO_3$, and $TiO_2/MoO_3$.

The apparatus of the invention oxidizes organic contaminants by combining a semiconductor photocatalyst surface, an oxidant source and a UV source directed onto the photocatalyst surface. The fluid (liquid or gas) containing organic contaminants is delivered over a first side of the porous substrate having a photocatalytic surface and the oxidant (liquid or gas) is delivered through a second side of the porous substrate to the first side of the photocatalyst surface where it contacts the contaminated fluid.

The photocatalyst surface is preferably a porous titanium dioxide layer or surface formed on a porous substrate. The substrate may be made from virtually any material that is sufficiently porous to pass an oxidant therethrough, can provide physical support for the photocatalyst material and is resistant to oxidation. For example, the substrate could be made from a porous metal, porous carbon or graphite, a sintered porous glass or a porous ceramic. The photocatalyst may be applied to the porous substrate by any means including: (1) applying a solution or slurry with a brush followed by sintering; (2) forming a sol-gel, applying the sol-gel by spraying, dipping, or spin coating, then drying and curing; (3) vacuum deposition processes, such as chemical vapor deposition and physical vapor deposition; or (4) electrochemical oxidation of a porous metal in an acid solution. The term "porous" as used in reference to the photocatalyst surface is intended to include any photocatalyst surface having passages therethrough for the oxidant. Therefore, the photocatalyst layer itself may be porous or, conversely, the photocatalyst may be a dense layer that simply leaves the pores of the substrate open. Theoretically, if the photocatalyst had sufficient strength and appropriate pore size, the porous substrate would not be necessary.

In a preferred embodiment, the photocatalytic surface has metal catalyst particles disposed therein. The metal catalyst can be a metal, metal oxide, or metal alloy, such as such as Pt group metals, Au group metals, Ir, Ru, Sn, Os, Mo, Zr, Cu, Nb, Rh, Pt—Sn, Pt—Mo, Pt—Ru, Ni—Zr, Pt—Rh, Pt—Ir, Pt—Ru—W, Pt—Ru—Os, Pt—Ru—Sn, Pt—Ni—Ti, Pt—Ni—Zr, Pt—Ni—Nb, platinum group metal oxides, gold group metal oxides, tin oxides, tungsten oxides, iridium oxides, rhodium oxides, ruthenium oxides and mixtures thereof. The preferred metal catalyst concentration is between about 0.01 wt % and about 5 wt % metal catalyst.

The contaminated fluid is delivered over the photocatalyst surface through a fluid cell adjacent the porous photocatalyst surface, wherein the fluid compartment or cell comprises a fluid inlet, a fluid outlet and a UV transmission surface positioned to expose the porous photocatalyst surface. The oxidant is delivered to the second side of the porous substrate through an oxidant compartment or cell adjacent the porous substrate, wherein the oxidant cell comprises an oxidant inlet. In order to operate the apparatus, an oxidant source is connected to the oxidant inlet, and an organic contaminant source (such as water or air containing organic compounds) is connected to the fluid inlet. During operation, a UV source provides UV light through the UV transmission surface and onto the porous photocatalyst surface.

In one aspect of the invention, methods are provided for oxidizing organics in two-phase systems. A first two-phase system is provided in which a contaminated gas stream (such as air) is passed over a solid, porous semiconductor photocatalyst and a gaseous oxidant (such as ozone, oxygen or a combination thereof) is provided to the porous photocatalyst. In a second two-phase system, a contaminated water stream is passed over a solid, porous semiconductor photocatalyst and a liquid oxidant (such as aqueous hydrogen peroxide) is provided to the porous photocatalyst. In either two-phase system, the oxidant and contaminant sources are delivered over opposing sides of the porous photocatalyst and contact each other adjacent the solid UV illuminated photocatalyst surface to provide oxidation of the organic contaminants.

In another aspect of the invention, methods are provided for oxidizing organics in three-phase systems. In a first three-phase system, a gaseous oxidant (such as ozone, oxygen or a combination thereof), a liquid containing organic components, and a porous, solid semiconductor photocatalyst converge and engage in an efficient oxidation reaction. Similarly in a second three-phase system, a gas containing organic components, a liquid oxidant, and a porous solid semiconductor photocatalyst converge and engage in an efficient oxidation reaction. In either three-phase system, the pores of the solid semiconductor photocatalyst have a region wherein the meniscus of the liquid phase varies from the molecular diameter of water to that of a capillary tube resulting in a diffusion layer that is several orders of magnitude smaller than diffusion layers in the closest known reactors. The gaseous oxidant source preferably provides ozone. The preferred source of ozone is an electrolytic cell which generates an oxidant stream comprising greater than about 10%, by weight of ozone. Such electrolytic cells, including depolarizing electrolytic cells, are described in U.S. Pat. No. 5,460,705 which description is incorporated by reference herein. A fully self-controlled electrolytic cell is most preferred for use at remote locations such as a groundwater treatment facility.

The UV source is preferably sunlight which enables a low cost apparatus that mineralizes low concentrations of organics in water, such as process water or groundwater, or in air. The UV source can also be an inexpensive low power UV lamp and the UV transmission surface of the fluid cell can be a UV transmission surface of the UV lamp. In addition, the UV source can also be a UV lamp with a broader UV spectrum, as used in conventional AOPs, and the UV transmission surface of the fluid cell can be a UV transmission surface of the UV lamp. It is also possible to transmit or deliver the UV light to the photocatalyst through various means or conduits, such as a fiber optic cable.

In a preferred embodiment, the invention provides an apparatus for oxidizing organic contaminants, comprising a porous substrate having a porous photocatalyst surface; a fluid cell adjacent the porous photocatalyst surface, the fluid cell comprising a UV transmission surface positioned to expose the porous photocatalyst surface, a fluid inlet and a fluid outlet; and an oxidant cell adjacent the porous substrate, the oxidant cell comprising an oxidant inlet.

Another aspect of the invention provides a packed-bed photoreactor in a generally flat configuration to improve the contact time between the photocatalyst and the contaminant as compared to annular reactors having the same fluid volume. The photocatalyst can be supported on particles (e.g., glass particles or silica gel), where the particles fill the inside of the planar photoreactor, or on a porous substrate. The oxidant (e.g., oxygen, ozone or hydrogen peroxide) can be mixed with the contaminant fluid through a set of valves before or upon entering the photoreactor and the photoreactor is exposed to UV light through a UV transmission surface. An example of a photocatalyst deposited on particles, as well as a method of making the coated particles, can be found in U.S. Pat. No. 5,501,801 to Zhang et al., which description is incorporated by reference herein.

Preferably, the photocatalytic surface has metal catalyst particles disposed therein. The metal catalyst can be a metal, metal oxide, or metal alloy, such as Pt group metals, Au group metals, Ir, Ru, Sn, Os, Mo, Zr, Ni, Nb, Rh, Pt—Sn, Pt—Mo, Pt—Ru, Ni—Zr, Pt—Rh, Pt—Ir, Pt—Ru—W, Pt—Ru—Os, Pt—Ru—Sn, Pt—Ni—Ti, Pt—Ni—Zr, Pt—Ni—Nb, Pt group oxides, gold group oxides, $SnO_2$, $WO_3$, $IrO_2$, $Rh_2O_3$, $RuO_2$ and mixtures thereof. The metal catalyst on the semiconductor surface, is believed to enhance either or both the electron and hole transfer reactions.

The thickness of each reactor can be as small as a few millimeters, in order for the light to penetrate and photoexcite the majority of the photocatalytic surfaces contained in the reactor. Thickness of the reactor may be determined based on the $TiO_2$ loading on the supporting particles (e.g., a higher percentage of catalyst on the supporting material will reduce light penetration, thus requiring a thinner reactor). The walls of the reactor are preferably made of a material that transmits UV light (preferably between 300 and 370 nm), such as PLEXIGLAS® or quartz. The reactor may also include dividers for directing the fluid flow so that the oxidant/contaminant mix contacts most of the photocatalyst surface. The space between the dividers in the packed bed photoreactor is typically filled with a support structure such as a glass or silica beads coated with a photocatalytic material such as $TiO_2$.

External illumination is used to photoexcite the $TiO_2$. Light sources can be arranged between two packed-bed photoreactors placed parallel with one another. Alternatively, the light source can be built to follow the shape of the flow field. Oxidants may be gases (e.g., oxygen and ozone) or liquids (e.g., hydrogen peroxide). The contaminated fluid may be liquid (e.g., contaminated water) or gas (e.g., contaminated air). The packed-bed reactors can work in series with the fluid leaving one reactor and entering a subsequent reactor or in parallel.

In another aspect of the present invention a planar packed-bed photoreactor is provided with a fluid cell having photocatalyst coated particles for treating a contaminant fluid and an oxidant cell or compartment adjacent to the fluid cell. An interface exists between the fluid cell and the oxidant cell that can be made of a porous material, such as ceramic or metal sheets. The oxidant flows from the oxidant cell through the porous interface to the fluid cell and may be regulated by maintaining a specific pressure in the oxidant cell. The pressure in the oxidant cell also acts to inhibit the flow of the contaminant fluid into the oxidant cell. Dividers that create a serpentine flow path, can be incorporated in the fluid cell to assure adequate contact between the contaminant fluid and the photocatalyst as the fluid traverses the dividers. The oxidant cell may also contain dividers. The photocatalyst can be supported on glass particles or silica gel, as described above, and these particles preferably are disposed in the space between the dividers. Ideally, the pressure in the oxidant cell is regulated such that the oxidant passes through in to the fluid cell and the contaminant does not pass into the oxidant cell. Oxidant cells and packed-bed fluid cells can be arranged in parallel and a row of UV lamps (having a wavelength preferably between 300 and 370 nm), may be placed between the packed-bed chambers. Alternatively, a single oxidant cell with two porous walls can be placed in between two fluid cells for supplying oxidant simultaneously to two separate fluid cells, reducing the number of oxidant cells needed. The packed-bed chambers can work in series with fluid leaving one reactor and entering a subsequent reactor or in parallel. A manifold may be connected to the fluid inlets of each reactor for delivering fluid to the reactors in parallel. Likewise, a manifold can be connected to the outlets for fluid removal.

In another aspect of the present invention, the packed bed photoreactor with an oxidant cell described above may be used with a photocatalyst supported directly on the porous interface such that the porous surface of the interface is adjacent to the oxidant cell and the photocatalytic surface is adjacent to the fluid cell. The fluid cell and/or the oxidant cell may have dividers creating a serpentine flow path to maximize the surface area contact between the photocatalyst and the contaminant, as well as between the oxidant and the porous substrate. Ideally, the pressure in the oxidant cell is regulated such that the oxidant reaches the porous photocatalytic surface, but does not pass through into the fluid cell and the contaminant does not pass into the oxidant cell. The oxidation of contaminants takes place at the interface between the photocatalyst coated surface, the contaminant, and the oxidant. A single oxidant cell may be used to provide oxidant for two opposing fluid cells. Likewise, one row of UV lamps can be used to photoexcite two opposing fluid cells.

In yet another aspect of the present invention, the packed bed reactor may employ a small oxidant chamber that supplies the oxidant through one wall at one or more ends of the reactor. The position of the oxidant chamber at one or more ends of the reactor does not block access of the light to the packed bed chamber, and therefore, both sides of the photoreactor can be illuminated. The common wall between the oxidant chamber and the packed-bed chamber is made of a porous material like that described previously. The continuous delivery of the oxidant to the packed bed chamber through the porous wall is controlled by the pressure at the oxidant inlet. As an alternative, two oxidant chambers can be positioned at the opposite ends of the packed-bed reactor. This design allows for proper oxidant concentration within the reactor so that the photomineralization of the organic contaminants can be completed. Oxidant is continuously supplied through one porous wall of the packed-bed photoreactor and contacts the photocatalyst coated particles disposed within the reactor. The contaminated fluid inlet can traverse the oxidant cell (without introducing contaminated fluid into the oxidant cell), or alternatively, it can be placed on another wall of the packed-bed chamber. In either case, the contaminated fluid does not enter the oxidant chamber.

FIG. 1 is a schematic diagram of a photocatalytic reactor 10 which utilizes UV light, oxidant, and a $TiO_2$ semiconductor membrane in a three-phase reaction zone to efficiently mineralize organics in water, such as process water, contaminated ground water, polishing water systems or potable water. This reactor uses an inexpensive low power UV lamp 20 to supply UV light to mineralize the organic contaminants. The photocatalytic reactor 10 also includes an impermeable outer cylinder 12 of any suitable material and a permeable inner cylinder 14 which comprises a porous substrate material 16 (See FIG. 1A) that is coated on the inside with a porous photocatalyst surface 18. The porous substrate material 16 and the porous photocatalyst surface 18 may be produced by a method described in U.S. Pat. No. 5,137,607, column 3, line 58, to column 4, line 55, which description is incorporated by reference herein. A UV lamp 20 is mounted at a first end 22 through the outer cylinder 12 and at a second end 24 through a fluid jet 26 which is mounted through the outer cylinder 12 and has a fluid inlet 28.

The inner cylinder 14 is mounted within the outer cylinder 12 to form an annular oxidant cell 30 having an oxidant inlet 32. The oxidant cell 30 does not have a similar oxidant outlet since oxidants introduced into the oxidant cell 30 pass through the porous material 16 which is adjacent the oxidant cell 30. The oxidants further pass through the porous photocatalyst surface 18 which is adjacent a fluid cell 34. The fluid cell comprises the fluid inlet 28, the fluid jet 26 which directs the fluid toward the porous photocatalyst surface 18, and a fluid outlet 36. The fluid jet 26 preferably has a plurality of centrifugal jets 38 drilled obliquely through the fluid jet 26 for directing the fluid toward the porous photocatalyst surface 18.

Figure 2:
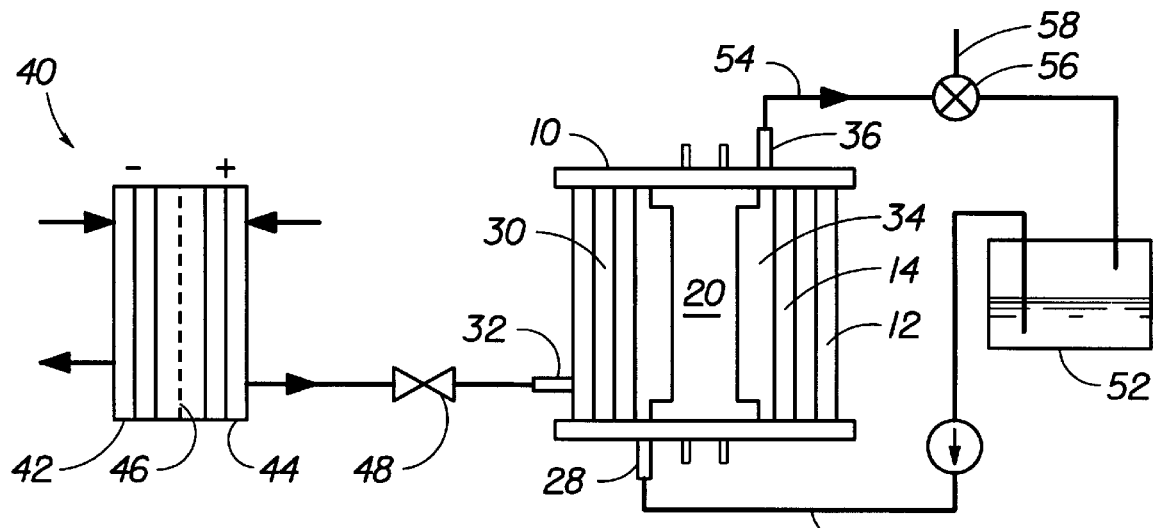
FIG. 2 is a schematic diagram of the photocatalytic reactor of FIG. 1 connected to a depolarized oxidant source and a water reservoir.

FIG. 2 is a schematic diagram of the photocatalytic reactor of FIG. 1 connected to a oxidant source and a water reservoir. The oxidant inlet 32 is connected to an ozone source 40 which is preferably a depolarizing electrolytic cell having a cathode 42, an anode 44, and optionally a proton exchange membrane 46 to convert water to an oxygen stream having greater than about 10% by weight of ozone. A depolarizing electrolytic cell is described in U.S. Pat. No. 5,460,705 which description is incorporated by reference herein. A gas pressure regulator 48 controls the delivery of ozone gas to the photocatalytic reactor 10.

The fluid inlet 28 is connected by pipes or tubing 50 to a reservoir containing the organic contaminant such as a storage tank 52. For a small fluid cell 34, the fluid outlet 36 may return the fluid to the storage tank 52 for recycling using pipes or tubing 54. A valve 56 diverts the fluid to a discharge pipe or tube 58 for analysis of the remaining amount of the organic contaminant. The performance of the photocatalytic reactor 10 may be checked by liquid chromatography, mass spectroscopy, total organic analysis, or gas chromatography. In order to mineralize a given amount of the organic contaminant in a single pass through the photocatalytic reactor 10, the size of the reactor can be increased or a plurality of small reactors can be connected in series or in parallel.

Figure 1A:
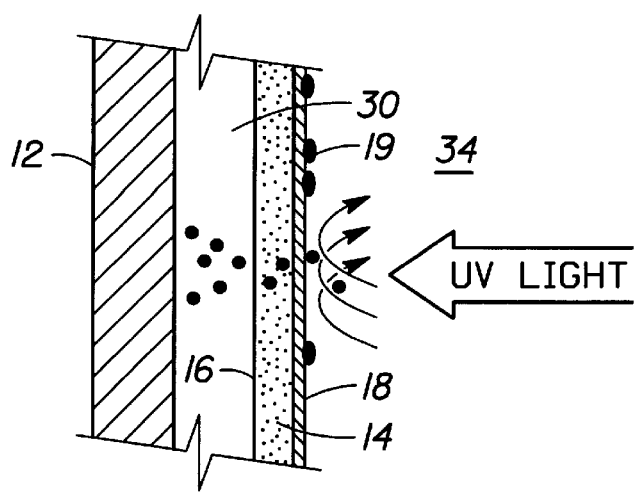
FIG. 1A is a schematic diagram of a section of the reactor of FIG. 1 showing details of the reaction zone.

FIG. 1A is a schematic diagram of a section of the photocatalytic reactor 10 of FIG. 1 showing details of the reaction zone. The reactor 10 is constructed with a porous $TiO_2$ surface 18 having a metal catalyst 19 disposed thereon on a porous substrate 16. An oxidant, such as ozone gas, feeds through the porous substrate and finally through the porous $TiO_2$ surface 18 where oxidation of organic contaminants occurs in a three-phase reaction zone shown in FIG. 3.

Figure 3:
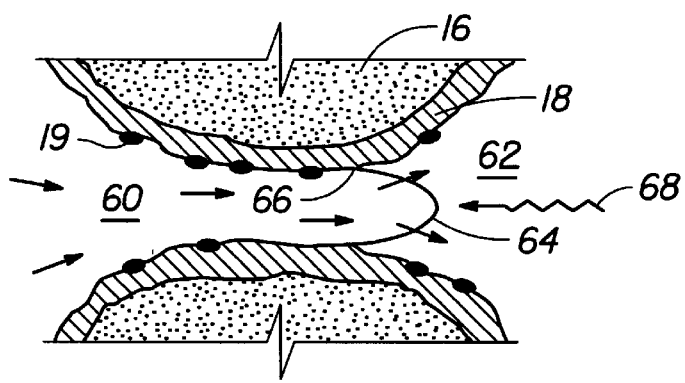
FIG. 3 is a schematic diagram of a pore in the semiconductor membrane of the reactor of FIG. 1.

FIG. 3 is a schematic diagram of a single pore in the semiconductor membrane of the reactor of FIG. 1 being used in a three-phase system. At some distance within the pores of the porous $TiO_2$ surface 18 and an optional catalyst 19, a gas region 60 diffuses into a fluid region 62 with a boundary layer 64 that contacts the $TiO_2$ surface 18 at a three-phase interface 66. UV light 68 joins the oxidant and organic contaminants at the interface 66 and accelerates photocatalytic oxidation. Where the oxidant is ozone, excess ozone may diffuse into the fluid and can be photolyzed by the UV light if a UV lamp with a broad UV spectrum (including wave lengths lower than 300 nm, preferably from 220 to 280 nm) is used, thus generating additional $OH^-$ radicals for non-catalyzed oxidation of organic contaminants.

Figure 4:
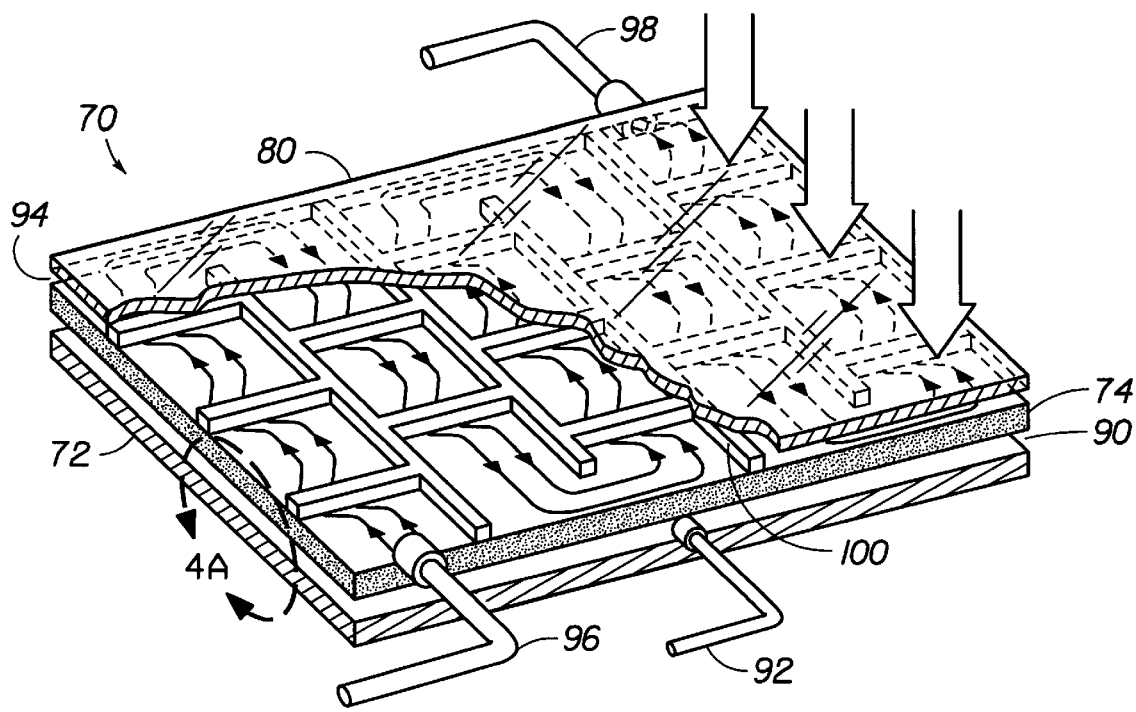
FIG. 4 is a schematic diagram of a photocatalytic reactor panel which combines solar UV light, oxidant, and a $TiO_2$ semiconductor membrane in a three-phase reaction zone to efficiently mineralize organics in water, such as process water, contaminated ground water, polishing water systems or potable water.

FIG. 4 is a schematic diagram of a photocatalytic reactor panel 70 which combines solar UV light, oxidant, and a $TiO_2$ semiconductor membrane in either a two-phase or three-phase reaction zone to efficiently mineralize organics in water, such as process water, contaminated ground water, polishing water systems or potable water, or in air. The photocatalytic reactor panels (shown with sidewalls removed) have the form of solar panels to obtain UV light from the sun. An array of the panels can be positioned in series or parallel as desired to destroy organic contaminants. The photocatalytic reactor panel 70 has an impermeable bottom 72 of any suitable material and a permeable center 74 which comprises a porous substrate material 76 that is coated on the top with a porous photocatalyst surface 78. The porous substrate material 76 and the porous photocatalyst surface 78 may be produced by a method described in U.S. Pat. No. 5,137,607, column 3, line 58, to column 4, line 55, which description is incorporated by reference herein. A UV transmission surface 80 covers the reactor and is positioned to expose the porous photocatalyst surface 78 to sunlight.

Figure 4A:
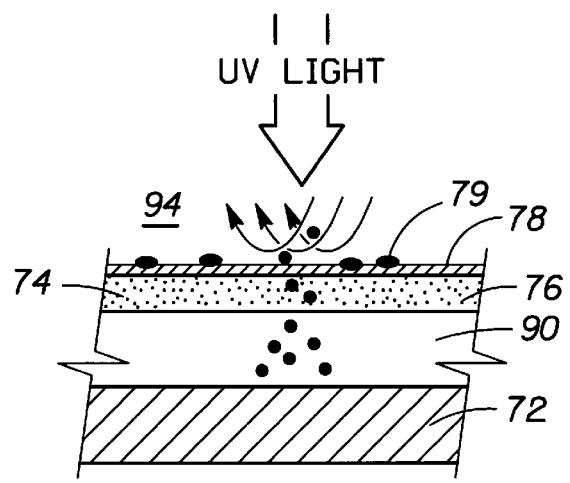
FIG. 4A is a schematic diagram of a section of the reactor of FIG. 4 showing details of the reaction zone.

FIG. 4A is a schematic diagram of a partial cross-section of the reactor of FIG. 4 showing details of the reaction zone.

The porous substrate material 76 is adjacent to an oxidant cell 90 having an oxidant inlet 92. The oxidant cell 90 does not typically have a similar oxidant outlet since oxidants introduced into the oxidant cell 90 pass through the porous substrate material 76 which forms a wall of the oxidant cell 90. The oxidant is provided to the porous photocatalyst surface 78 which is adjacent to a fluid cell 94. The fluid cell 94 has a fluid inlet 96 and a fluid outlet 98. The fluid cell 94 has a baffle 100 which directs a fluid through the panel from the fluid inlet 96 to the fluid outlet 98 and toward the porous catalyst surface 78.

Figure 5:
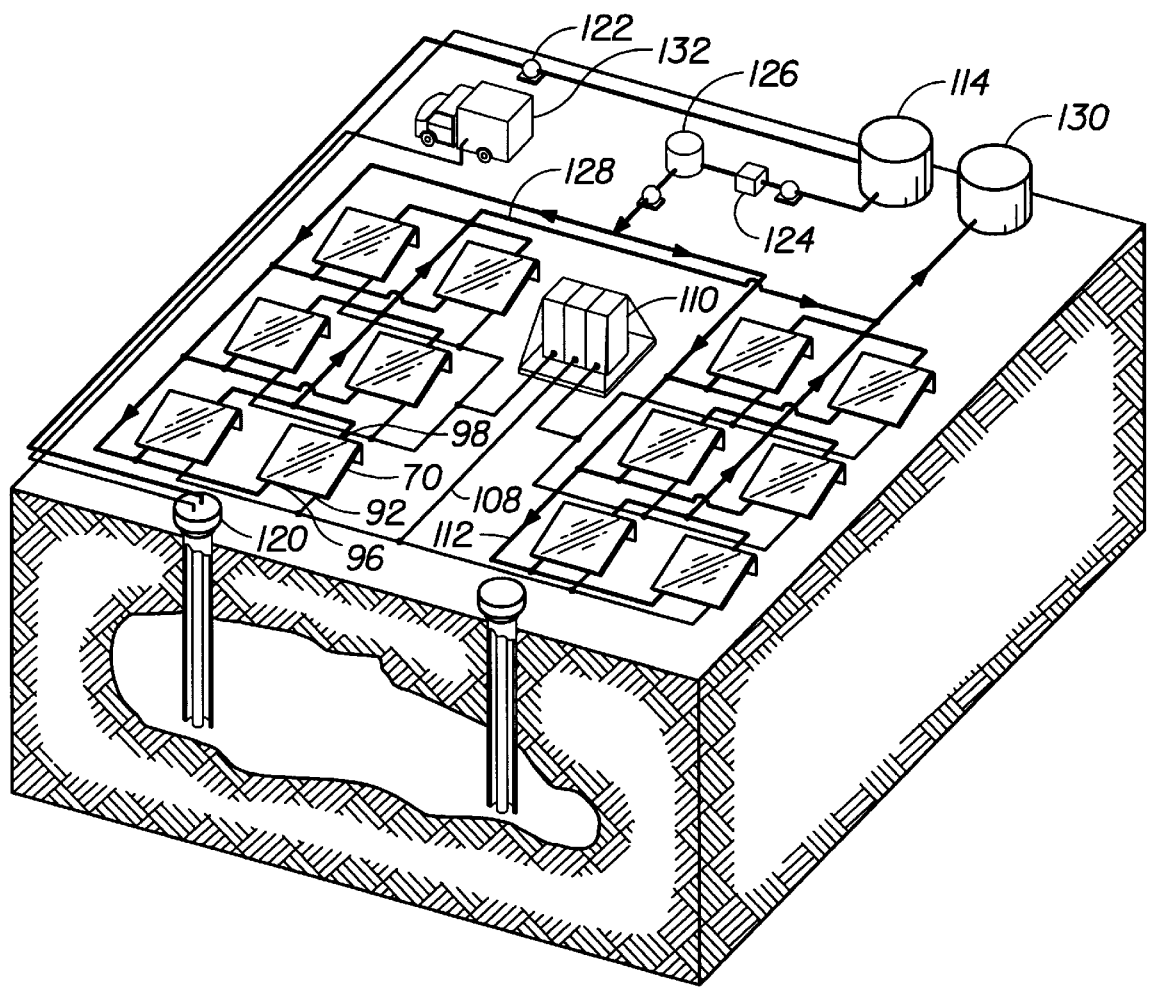
FIG. 5 is a schematic diagram of an array of the photocatalytic reactor panels of FIG. 4 connected in parallel to a portable oxidant source and a groundwater treatment system.

FIG. 5 is a schematic diagram of an array of the photocatalytic reactor panels 70 of FIG. 4 connected in parallel to a portable oxidant source 110 and a groundwater treatment system. The oxidant inlets 92 on an array of reactor panels 70 are preferably connected in parallel by oxidant lines 108 to an oxidant source 110. The oxidant source is preferably an array of electrolytic cells which convert water to an oxygen stream having greater than about 10% by weight of ozone.

The fluid inlets 96 on the array of reactor panels 70 are connected in parallel by pipes 112 to a source of organic contaminant such as a storage tank 114. The organic contaminant can be contaminated ground water, polishing water systems collected from one or more extraction wells 120 by a pump 122. A filter system 124 and a pH adjustment tank 126 will typically be required for treatment of the groundwater prior to oxidation of the contaminant. The fluid outlets 98 on the array of reactor panels 70 are connected in parallel by pipes 128 to a storage tank 130 which holds treated water for re-injection or further treatment. The reactor panels 70 can be located at a remote site using mobile electronic equipment and power supplies 132.

Figure 6:
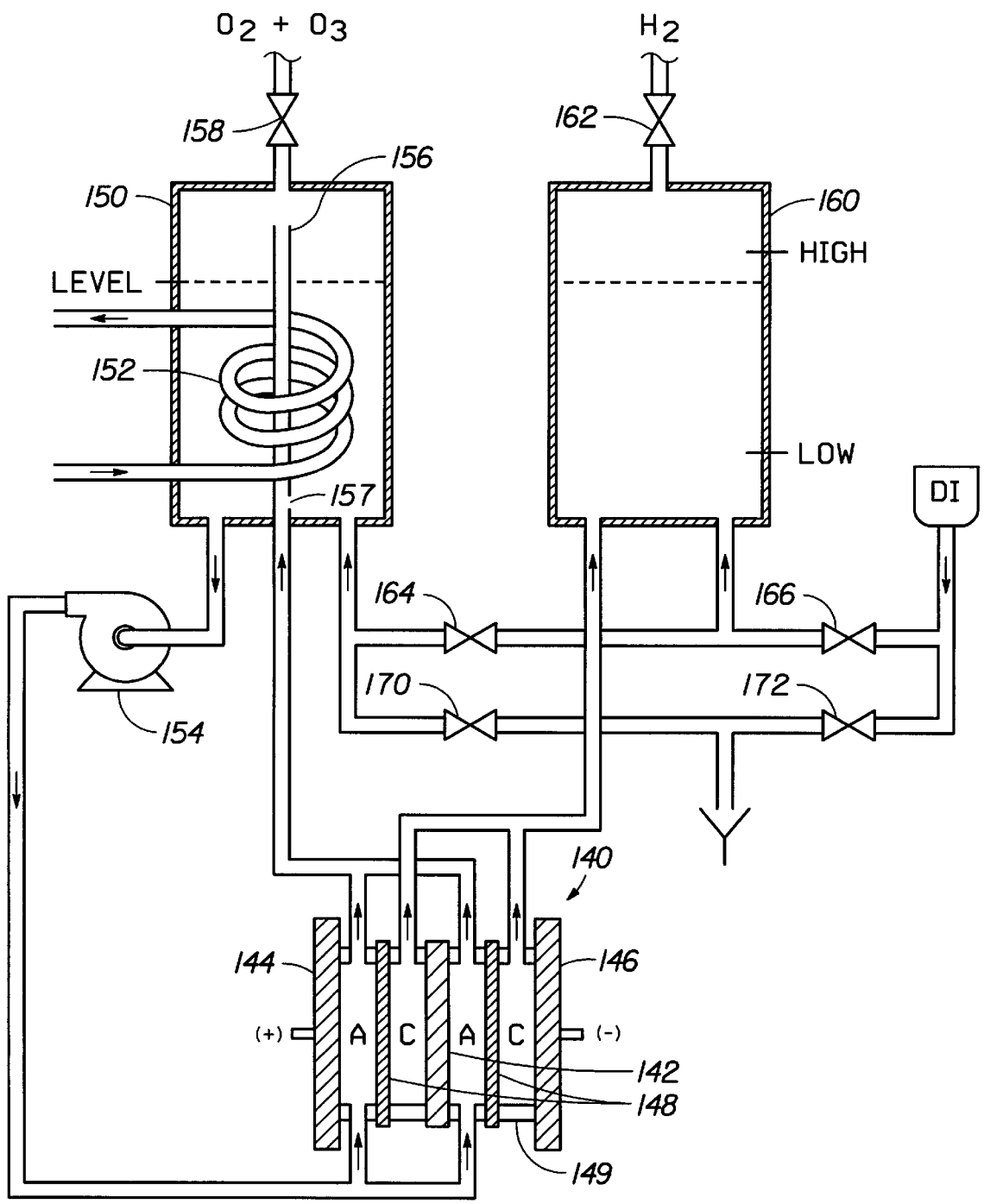
FIG. 6 is a schematic diagram of an ozone source having electrolytic cells for producing ozone under pressure.

FIG. 6 is a schematic diagram of a self controlled ozone source 110 having electrolytic cells for producing ozone under pressure. The electrolytic cells are illustrated having an array of electrolytic cells (two shown) 140, separated by a bipolar plate 142, that are sandwiched between a positive end plate 144 and a negative end plate 146. Each of the individual cells have an anode and anode flowfield A as well as a cathode and cathode flowfield C separated by a proton exchange membrane 148 as described in U.S. Pat. No. 5,460,705, which description is incorporated by reference herein. The anode is preferably made from sintered porous titanium coated with lead dioxide and the cathode is preferably pressed carbon fibers or porous carbon having platinum electroplated on both sides to act as an electrocatalyst for hydrogen evolution. Note that fluid flow is shown as passing through non-conductive cell walls 149 for simplicity, although fluids preferably pass through openings in the end plates 144, 146, bipolar plates 142, and proton exchange membranes 148 as described in the '705 patent. Another ozone source that has shown good results is describe in pending application Ser. No. 08/829,604, which description is incorporated by reference herein.

An anode reservoir 150 holds deionized water which is cooled by coils 152 and recirculated by a pump 154 through the anode cells A. The anode reservoir 150 serves as a liquid/gas separator wherein oxygen and ozone generated in the anode cells A diffuse from the deionized water in a stand pipe 156 and collect at the top of the reservoir 150. A small hole 157 near the bottom of the stand pipe 156 allows the water level to drop in the stand pipe 156 when the anode pump is off and the ozone generator is in a low flow idle mode so that water will continue to circulate from the anodes and the anode reservoir due to thermal convection. The small hole 157 does not interfere with flow of the water and gases up the stand pipe 156 during normal operation. An ozone pressure control valve 158 controls the flow of gases from the top of the reservoir 150 in co-operation with information from various system monitors including a liquid level indicator.

A cathode reservoir 160 holds deionized water and the cathode recovery water which rises from the cathode cells C. The cathode reservoir also serves as a liquid-gas separator wherein hydrogen generated in the cathode cells C collects at the top of the reservoir 160. A hydrogen control valve 162 controls the flow of hydrogen gases from the top of the reservoir 160 in co-operation with various system monitors including high/low liquid level indicators.

The anode reservoir 150 and the cathode reservoir 160 are connected to a source of deionized water (DI) with tubing that includes a first shut-off valve 166 and a second shut-off valve 164. A drain loop having a third shut-off valve 170 and a fourth shut-off valve 172 bypasses the first and second shut-off valves 166, 164 for flushing or draining the system.

Figure 7:
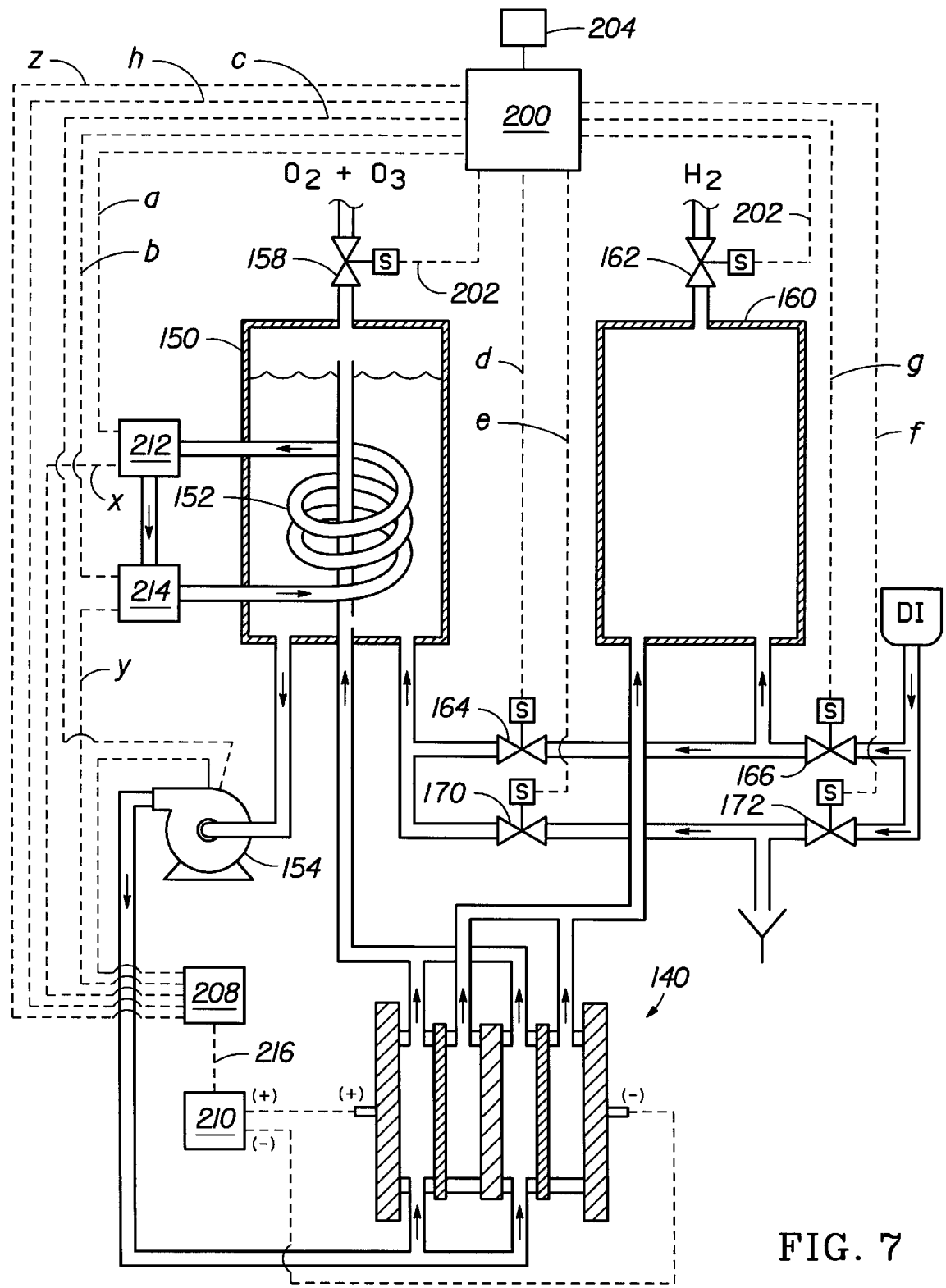
FIG. 7 is a schematic diagram of the ozone source of FIG. 6 included in a self-controlled apparatus which operates with sources of electricity and distilled water.

FIG. 7 is a schematic diagram of the ozone source 110 of FIG. 6 included in a self-controlled apparatus which operates with sources of electricity and distilled water. The array of electrolytic cells 140, the anode reservoir 150, and the cathode reservoir 160 are combined in an ozone generator which is self-controlled by a system controller 200 over control lines 202, a–h. The ozone generator 110 includes a pump, a refrigerant compressor and control valves that are controlled by the system controller 200 which executes system control software stored in a memory 204.

The ozone generator 110 further includes a power supply unit 208 and a power converter 210 for converting AC current to DC current for operation of the array of electrolytic cells 140. A condenser 212 and a compressor 214 are also included for operating the cooling coil 152 in the anode reservoir 150. All components include analog assemblies which are controlled by the system controller 200. The process steps discussed herein can be implemented using a computer program that runs on, for example, the system controller 200. Furthermore, all electrical components are powered by the power supply unit 208 by power lines 216, x–z.

Figure 8:
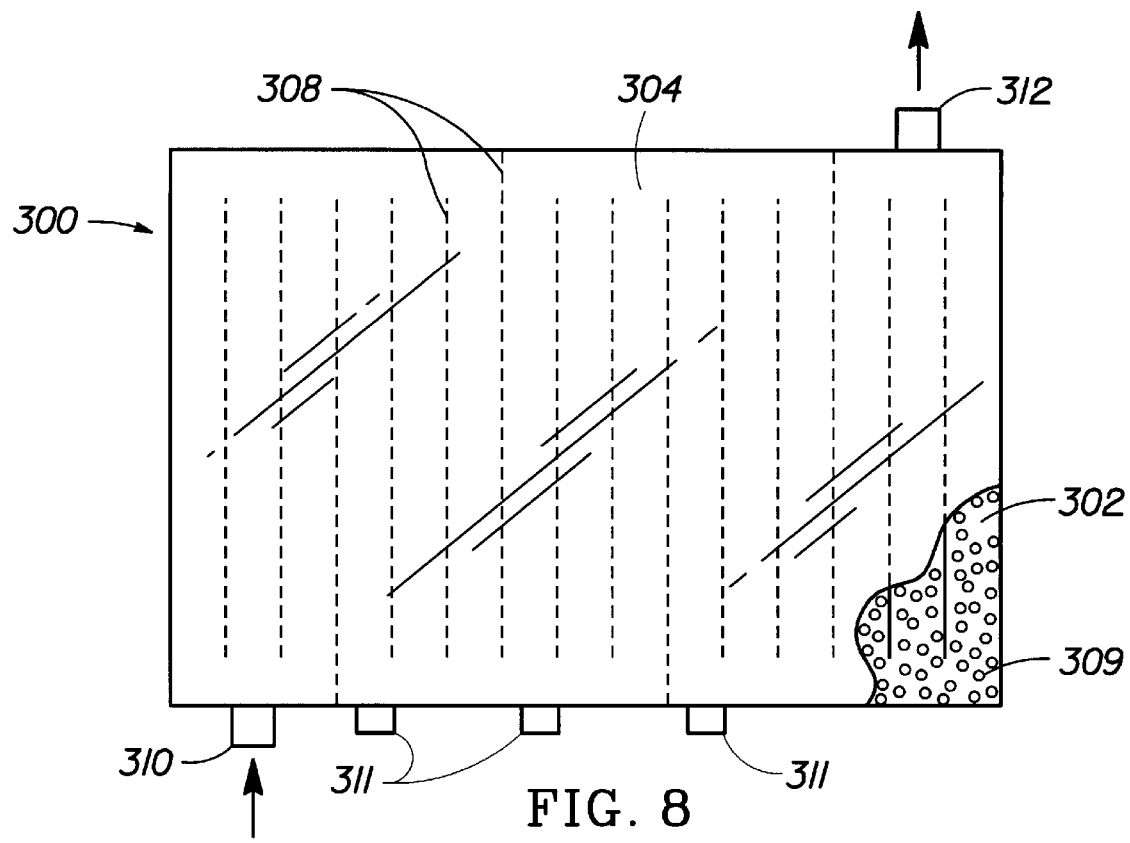
FIG. 8 is a schematic diagram of a packed bed photoreactor.
Figure 9:
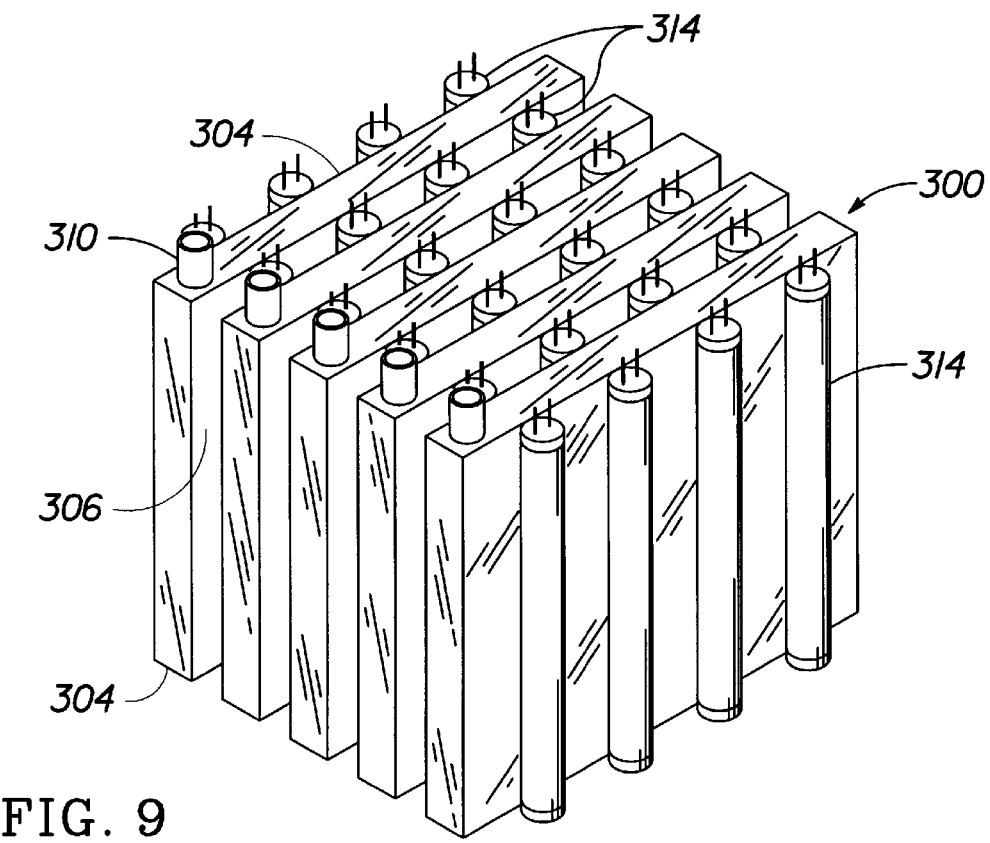
FIG. 9 is a schematic diagram of a array of the photoreactors of FIG. 8 with the flow fields removed.

FIG. 8 is a schematic diagram of a packed bed photoreactor. The generally planar photoreactor 300 has fluid cell 302 bounded by a top UV transmissible wall 304 and a bottom wall 306 and a plurality of dividers 308 therein. The bottom wall 306 may also be made from a UV transmissible material. The photoreactor 300 is filled with photocatalyst coated particles 309. Both contaminant and oxidant can be fed into the inlet 310 and exit through outlet 312. The contaminant and oxidant are mixed before or upon entering the photoreactor. The contaminant and oxidant may be mixed through a valve or they may mix as they enter the photoreactor. The packed-bed photoreactor 300 can be illuminated by a UV light 314 individually or as shown in FIG. 9. The particles may include a metal catalyst 19 like that shown in FIG. 1A. Alternatively, contaminant can enter through inlet 310 and oxidant can enter through multiple inlets 311. With multiple oxidant inlets, oxidant may be delivered to the reactor at different times to avoid depletion of the oxidant before complete mineralization of the organic contaminant has taken place.

FIG. 9 is a schematic diagram of an array photoreactors in accordance with FIG. 8. The flow fields are not shown with the photoreactors 300 only for the purpose of clarity in the drawing. The photoreactors 300 are in a parallel arrangement such that a single UV light source or compartment 314 can be used to illuminate two opposing photoreactors 300 simultaneously. The fluids can be passed from one photoreactor to the next or in parallel. Each photoreactor 300 can be as thin as few millimeters, thus allowing for a very compact design.

Figure 10:
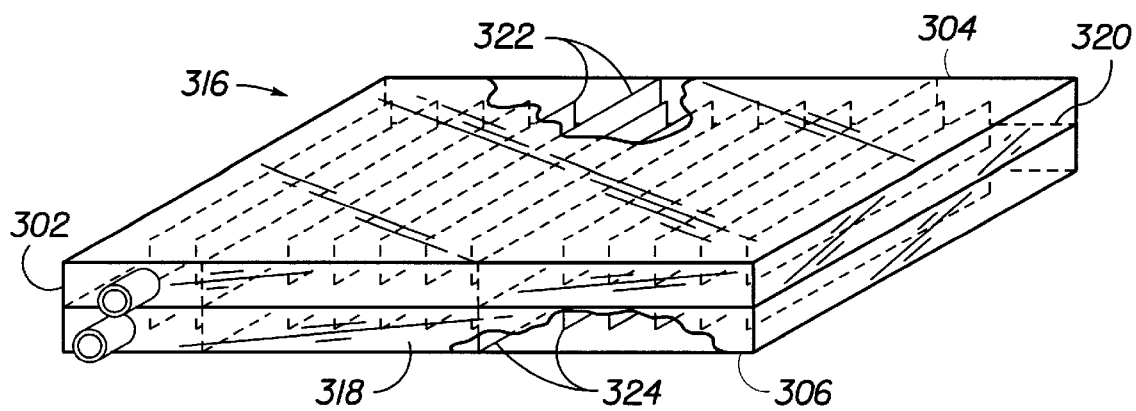
FIG. 10 is a schematic diagram of a packed bed photoreactor having an oxidant cell.

FIG. 10 is a schematic diagram of a packed bed photoreactor 316 having a fluid cell 302 and an oxidant cell 318. The photoreactor 316 is similar to the one shown in FIG. 8, with the addition of an oxidant cell 318 adjacent to the fluid cell 302. There is a porous wall 320 separating the oxidant cell 318 from the fluid cell 302. The porous wall 320 can be made from a fine metal mesh or ceramic so that an oxidant will controllably pass through the porous wall 320 and into the fluid cell 302. The fluid cell 302 may be packed with photocatalyst coated particles 309, which react with the contaminant when the UV light is applied and the oxidant contacts the photocatalyst surface on the particles. Ideally, the pressure in the oxidant cell is regulated such that the oxidant travels to the chamber containing the photocatalyst, mixing with the contaminated fluid, and reaching the photocatalytic surface where the contaminants are oxidized in the presence of UV light. By keeping a proper pressure in the oxidant chamber, the contaminant fluid does not pass into the oxidant cell.

Alternatively, the porous interface 320 in FIG. 10 can have a photocatalyst on one side of the porous wall 320, such that the uncatalyzed surface of the porous wall faces to the oxidant cell and the photocatalytic surface faces to the fluid cell. The fluid cell and the oxidant cell may each have dividers as described previously. Ideally, the pressure in the oxidant cell is regulated such that the oxidant travels to the photocatalyst surface where it reacts at the $TiO_2$ surface in the presence of UV light and does not pass to the bulk fluid in the fluid cell. Likewise, the contaminant fluid does not pass into the oxidant cell. The photocatalyst may contain a metal, metal oxide or metal alloy.

Figure 11:
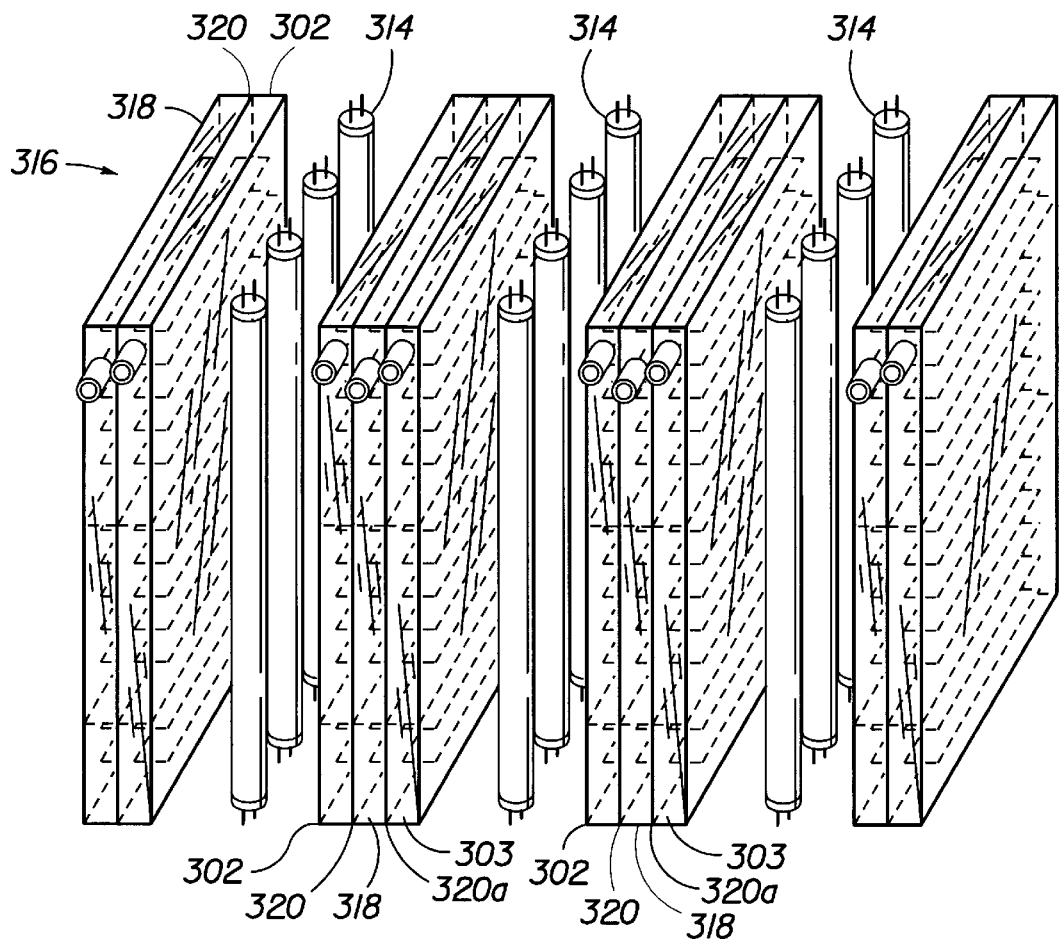
FIG. 11 is a schematic diagram of an array of the photoreactors of FIG. 10.

FIG. 11 is a schematic diagram of a stack of photoreactors similar to reactor 316 shown in FIG. 10. The photoreactors can be positioned in a parallel arrangement so that only a single UV source 314 (e.g. a row of UV lamps) is needed to illuminate the photocatalytic surfaces in two photoreactors 316 at one time. As shown, a single oxidant cell 318 may be used to provide oxidant for two fluid cells 302,303. In this arrangement, a second porous wall 320a is required to transmit the oxidant to the additional fluid cell 303. The photocatalytic surface may be on particles or on a porous substrate separating the oxidant cell from the fluid cell. Alternatively, each fluid cell may have its own oxidant cell with the oxidant chambers placed back to back and the fluid chambers facing a common UV source.

Figure 12:
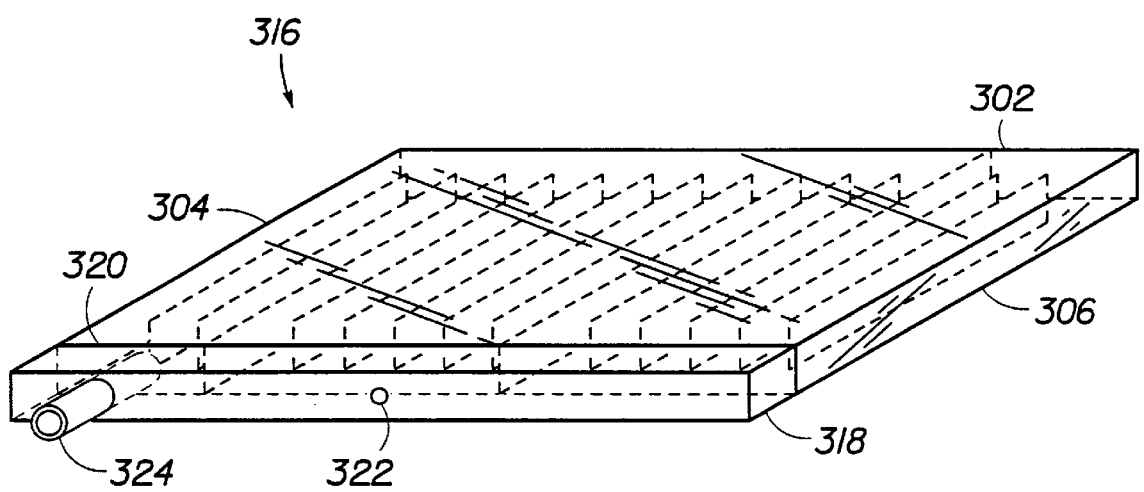
FIG. 12 is a schematic diagram of a packed bed photoreactor having multiple oxidant chambers.

FIG. 12 is a schematic diagram of a packed bed photoreactor similar to the reactor shown in FIG. 8. The packed bed photoreactor 316 has a fluid cell 302 and an oxidant cell 318. The oxidant cell 318 is positioned adjacent to the fluid cell 302 at one end and includes a porous wall 320 separating the oxidant cell 318 from the fluid cell 302. The porous wall 320 can be made from metal mesh or ceramic so that an oxidant will pass through the porous wall 320 and into the fluid cell 302. Oxidant enters the oxidant cell 318 through inlet 322 and contaminant enters the fluid cell 302 through inlet 324. The fluid cell 302 may be packed with photocatalyst coated particles 309 (described previously), which react with the contaminant when the UV light is applied and the oxidant contacts the photocatalyst surface on the particles. The photocatalyst may contain a metal, metal oxide or metal alloy as discussed above. The position of the oxidant cell 318 allows the illumination of the photocatalyst material in 302 through the opposing faces of the photoreactor 316.

Ideally, the pressure in the oxidant cell 318 is regulated such that the oxidant travels to the fluid cell 302 containing the photocatalyst coated particles and is mixed with the contaminated fluid, reaching the photocatalytic surfaces on the particles, where the contaminants are oxidized in the presence of UV light. By keeping an appropriate pressure in the oxidant cell 318, the contaminant fluid does not pass into the oxidant cell 318.

The invention includes a process for oxidizing organic contaminants in a fluid such as water or air, comprising the steps of flowing a fluid containing organic contaminants over a porous photocatalyst surface, flowing oxidant (such as oxygen, ozone or $H_2O_2$) through the porous photocatalyst surface into the flowing fluid, and exposing the photocatalyst surface to UV light. Preferably, the fluid flows through a fluid cell adjacent the porous photocatalyst surface, the fluid cell comprising a UV transmission surface positioned to expose the porous photocatalyst surface, a fluid inlet, and a fluid outlet. The oxidant flows through an oxidant cell adjacent the porous substrate material, the oxidant cell comprising an oxidant inlet.

Semiconductor photocatalysis can be used to mineralize many types of organic compounds, such as aromatics, alkanes, alkenes, alcohols, haloaromatics, haloalkanes, haloalkenes, haloalcohols, acids, polymers, surfactants, herbicides, pesticides, dyes and nitroaromatics. A process for mineralizing cyanuric acid, and chloro-fluorocarbons (but not their hydrogen-containing substitutes) has not previously been known. The susceptibility of such a wide variety of compounds to treatment in accordance with the present invention, makes photocatalytic degradation a particularly attractive process for air purification and wastewater treatment.

During semiconductor photocatalysis, under illumination, electrons (e−) and holes (h+) are generated in the space charge region of the semiconductor. Under proper conditions, the photo-excited electrons (in the conduction band (CB) of the semiconductor) and photo-excited holes (in the valence band (VB) of the semiconductor) can be made available for oxidation-reduction reactions. The photogenerated holes in the VB must be sufficiently positive to carry out the oxidation of adsorbed OH⁻ ions or $H_2O$ molecules to produce OH˙ radicals (the oxidative agents in the degradation of organic pollutants). The photogenerated electron usually reacts with oxygen or any other oxidant. The metal catalyst on the semiconductor surface, is believed to enhance either or both the electron and hole transfer reactions.

One method and apparatus of the invention enables feeding the oxidant (e.g., $O_3$, $H_2O_2$, $O_2$ or combinations thereof) through a porous substrate directly to the semiconductor/fluid/oxidant interface. This technique increases the concentration of oxidant at the reaction sites on the surface of the photocatalyst, increasing the heterogeneous reaction rate by several orders of magnitude. In addition, the energy requirements for the reduction reaction in the photocatalyst system can be decreased by the use of $O_3$ or $H_2O_2$ instead of only $O_2$. Electrochemical ozone generation provides an oxygen/ozone stream that is highly concentrated with $O_3$, typically between about 10 and about 18 wt %, or greater, ozone, as the reactant for the reduction reaction in the photodegradation of organic pollutants.

An additional apparatus and method of the invention provides a packed-bed photoreactor in a generally flat configuration to improve the contact time between the photocatalyst and the contaminant as compared to annular reactors. One version of the photoreactor is typically filled with photocatalyst supported on glass particles or silica gel. The oxidant (e.g., oxygen, ozone or hydrogen peroxide) can be mixed with the contaminant fluid upon entering the photoreactor and oxidant can be fed to the reactor in a constant stream to ensure that the oxidant level in the reactor remains high enough to promote complete mineralization of the contaminants.

Ozone gas is preferably generated by an electrochemical method which offers both process and cost benefits. Electrochemical methods generate ozone by the electrolysis of water using a specially designed electrochemical cell. Sources of electrical power and water are the only requirements for producing $O_3$ electrochemically. The need for drying an oxygen gas stream is eliminated and there are no toxic by-products formed. The reactions occur by applying DC power between the anode and cathode which are placed on either side of a proton-exchange membrane (PEM), preferably made from a perfluorinated sulfonic acid (PFSA) polymer which displays a very high resistance to chemical attack. The use of a PEM instead of a liquid electrolyte offers several advantages: (i) fluid management is simplified and the potential for leakage of corrosive liquids is eliminated; and (ii) the PEM/anode interface provides a chemical environment which is well-suited to the electrochemical $O_3$ reaction. Water is fed to the anode side where water oxidation takes place through the thermodynamically favored $O_2$ evolution reaction, and the $O_3$ formation reaction.

Utilization of high overpotentials and certain electrode materials selectively enhance $O_3$ formation at the expense of $O_2$ evolution. The water oxidation reactions yield protons and electrons which are recombined at the cathode. Electrons are conducted to the cathode via the external circuit. The cathodic reaction is the reduction of $O_2$, wherein air typically serves as the $O_2$ source.

Photo-Degradation of DCB Using $TiO_2$ Membranes and Different Oxidants

The apparatus and method of the invention was used to study the kinetics of the photo-degradation of 1,4-dichlorobutane (DCB, a surrogate of the mustard gas warfare agent). The photo-degradation was studied using the experimental photocatalytic reactor 10 with a porous $TiO_2$ membrane 18. The annular porous $TiO_2$ membrane had a particle size of about 4–10 nm, 40–70% porosity, high surface area (about 145 $m^2$/g), and 100–1000 nm $TiO_2$ thickness as fabricated by the sol-gel method of U.S. Pat. No. 5,137,607 and deposited on a porous alpha-alumina tube.

Different oxidants ($O_3$, $O_2$, and $H_2O_2$) were compared. Oxidants were introduced through the oxidant cell to the $TiO_2$/liquid interface. An inexpensive low energy UV lamp (330–420 nm, with maximum intensity at 370 nm) was used. The lamp energy was enough to create the electron-hole pair in $TiO_2$ (the photo-excitation of $TiO_2$ requires light with wavelengths shorter than 380 nm). The $TiO_2$/UV/$O_3$ system reduced the DCB concentration about ten times faster than $TiO_2$/UV/$O_2$ and about two times faster than $TiO_2$/UV/$H_2O_2$. In addition, for the same treatment time, the DCB concentration remaining in solution was six times lower with the $O_3$ treatment than with $H_2O_2$. Direct homogeneous degradation of DCB with $O_3$ and $H_2O_2$ also occurred, but at much lower rates (6 to 10 times) than the heterogeneous reaction. Stripping of DCB was not significant with respect to the photo-degradation of DCB in the presence of $O_3$ or $H_2O_2$.

The disappearance of DCB in the presence of $O_2$ showed poor performance, and it seems to be mainly affected by stripping, since the reaction rates in the presence of $O_2$ and $N_2$ under UV illumination and dark conditions are about the same within the experimental error. DCB stripping was not substantially affected by increasing the pumping rate of the solution. On the other hand, a substantial enhancement of the photo-degradation of DCB was obtained by increasing the convection or turbulence of the solution. This indicates that faster degradation of the contaminant can be achieved by using faster convection mechanisms.

Based on these results, the rate of the photo-degradation of organic pollutants was increased by combining porous $TiO_2$/UV and $O_3$ in a new reactor that increases the convection of the solution so that pollutants make better and faster contact with the photocatalytic surface.

Groundwater Treatment

Mineralization of organic contaminants in groundwater will occur in the system shown in FIGS. 4–7 which includes an array of photocatalytic reactor panels 70 having no moving parts and associated components including a self-controlled ozone generator 110. Pretreatment of the groundwater may occur continuously until holding tanks are filled. One or more ozone generators 110 preferably supply sufficient ozone during daylight hours to operate the photochemical reactor panels 70 since storage of ozone is not economical. The ozone generators 110 can be programmed to provide desired ozone production during daylight hours and remain idle during specific time periods and upon command. Operation of the photocatalytic reactor panels 70 and other associated equipment will be readily understood by persons skilled in water treatment.

Examples of contaminants that can be removed from water are acetone, chlorobenzene, cresols, formaldehyde, hydrazines, isopropanol, methyl ethyl ketone, naphthalene, phenol, toluene, trichloroethylene, PCBs, xylenes, halogenated solvents (dichloroethylene, trichloroethylene and tetrachloroethylene), xylene, benzene, cresol, chloroform, trichloroethane, bromodichloromethane, organophosphorus pesticides and herbicides (atrazine, alachlor, and bromacil), coliform bacteria and viruses, color removal, odor removal, COD and BOD reduction, and residues from explosives manufacture (TNT, RDX, HMX, nitroglycerine). The apparatus can also be used for photo-bleaching of colored Kraft lignin, destruction of chemical warfare agents such as mustard gas, and treatment of effluents from metal finishing processes such as cyanide and EDTA.

While the foregoing is directed to the preferred embodiment of the present invention, other and further embodiments of the invention may be devised without departing from the basic scope thereof, and the scope thereof is determined by the claims which follow.

What is claimed is:

1. An apparatus for oxidizing organic contaminants, comprising:
    a substrate having a photocatalytic surface,
    a fluid cell in communication with the photocatalytic surface of the substrate, the fluid cell comprising an ultraviolet transmission surface positioned to expose the photocatalytic surface to ultraviolet light, an oxidant inlet, a fluid inlet, and a fluid outlet, wherein the fluid cell is generally flat; and
    an ultraviolet light source adjacent to the ultraviolet transmission surface.

2. The apparatus of claim 1, wherein the photocatalyst surface is a porous titanium dioxide surface.

3. The apparatus of claim 1, wherein the photocatalyst surface is a porous titanium dioxide based binary oxide surface.

4. The apparatus of claim 1, wherein the substrate comprises a photocatalyst supported on a plurality of particles.

5. The apparatus of claim 4, wherein the particles are made of glass, silica gel, silica beads, ceramics, metals or fiberglass.

6. The apparatus of claim 3, wherein the titanium dioxide based binary oxide is selected from $TiO_2/SiO_2$, $TiO_2/ZrO_2$, $TiO_2/SnO_2$, $TiO_2/WO_3$, $TiO_2/MoO_3$, and mixtures thereof.

7. The apparatus of claim 1, wherein the fluid cell further comprises a flow field divider for directing the flow of a contaminant fluid in contact with the photocatalyst surface.

8. The apparatus of claim 1, wherein the fluid cell further comprises a plurality of serpentine dividers positioned in parallel.

9. The apparatus of claim 1, further comprising a plurality of fluid cells positioned in parallel, wherein the ultraviolet light source is positioned between each fluid cell.

10. The apparatus of claim 1, wherein the oxidant inlet is positioned adjacent to the fluid inlet.

11. The apparatus of claim 1, wherein the oxidant inlet comprises an oxidant transmission surface having pores extending therethrough.

12. The apparatus of claim 1, further comprising an oxidant source connected to the oxidant inlet, and an organic contaminant source connected to the fluid inlet.

13. The apparatus of claim 12, wherein the oxidant is selected from oxygen, ozone, hydrogen peroxide, or combinations thereof.

14. The apparatus of claim 11, wherein the oxidant transmission surface is connected to an oxidant source.

15. The apparatus of claim 1, wherein the ultraviolet source exposes the photocatalytic surface to ultraviolet light.

16. The apparatus of claim 12, wherein the oxidant source comprises an electrolytic cell which generates an oxygen stream comprising greater than about 10% by weight of ozone.

17. An apparatus for oxidizing organic contaminants, comprising:
   a substrate having a photocatalytic surface,
   a fluid cell in communication with the photocatalytic surface of the substrate, the fluid cell comprising an ultraviolet transmission surface positioned to expose the photocatalytic surface to ultraviolet light, an oxidant inlet, a fluid inlet, and a fluid outlet, wherein the fluid cell is generally flat; and
   an ultraviolet light source adjacent to the ultraviolet transmission surface, wherein the ultraviolet light source is solar light.

18. The apparatus of claim 15, wherein the ultraviolet source is an ultraviolet lamp.

19. The apparatus of claim 15, wherein the ultraviolet source is an ultraviolet lamp which includes the ultraviolet wavelength range of 200–400 nm.

20. The apparatus of claim 1, further comprising a metal catalyst disposed in the photocatalyst.

21. The apparatus of claim 20, wherein the metal catalyst is selected from is selected from Pt group metals, Au group metals, Ir, Ru, Sn, Os, Mo, Zr, Nb, Rh, Ag, Pd, Cu and mixtures thereof.

22. The apparatus of claim 20, wherein the photocatalyst comprises between about 0.01 wt % and about 5 wt % metal catalyst.

23. The apparatus of claim 20, wherein the metal catalyst is selected from platinum group metal oxides, gold group metal oxides, tin oxides, tungsten oxides, iridium oxides, rhodium oxides, ruthenium oxides and mixtures thereof.

24. A reactor for oxidizing organic contaminants comprising:
   a porous substrate having a photocatalyst disposed on one surface and pores extending therethrough;
   a fluid cell adjacent the photocatalyst surface, the fluid cell comprising a fluid inlet, a fluid outlet, and a ultraviolet transmission surface positioned to expose the porous photocatalyst surface;
   an oxidant cell adjacent a second, opposed surface of the porous substrate, the oxidant cell comprising an oxidant inlet;
   a second porous substrate having a photocatalyst disposed on one surface, an opposing surface and pores extending therethrough; and
   a second fluid cell adjacent to the photocatalyst surface of the second porous substrate, the fluid cell comprising a fluid inlet, a fluid outlet, and a ultraviolet transmission surface positioned to expose the porous photocatalyst surface;
   wherein the oxidant cell is adjacent to the opposing surface of the second porous substrate.

25. The apparatus of claim 24, further comprising a plurality of reactors.

26. The apparatus of claim 25, wherein the reactors are positioned in parallel so that the ultraviolet transmission surface of one reactor faces the ultraviolet transmission surface of an adjacent reactor.

27. The apparatus of claim 24, wherein the first and second photocatalyst surfaces comprise titanium dioxide.

28. The apparatus of claim 27, wherein the photocatalyst surfaces comprise a titanium dioxide based binary oxide.

29. The apparatus of claim 28, wherein the titanium dioxide based binary oxide is selected from $TiO_2/SiO_2$, $TiO_2/ZrO_2$, $TiO_2/SnO_2$, $TiO_2/WO_3$, $TiO_2/MoO_3$, or mixtures thereof.

30. The apparatus of claim 24, further comprising an oxidant source connected to the oxidant inlet, and an organic contaminant source connected to the fluid inlet.

31. The apparatus of claim 30, wherein the oxidant source is selected from oxygen, ozone, hydrogen peroxide, or combinations thereof.

32. The apparatus of claim 29, further comprising an ultraviolet source which exposes the photocatalyst surface to ultraviolet light.

33. The apparatus of claim 30, wherein the oxidant source comprises an electrolytic cell which generates an oxygen stream comprising greater than about 10% by weight of ozone.

34. The apparatus of claim 32, wherein the ultraviolet source is solar light.

35. The apparatus of claim 32, wherein the ultraviolet source is an ultraviolet lamp.

36. The apparatus of claim 31, wherein the ultraviolet source is an ultraviolet lamp which includes the ultraviolet wavelength range of 200–400 nm.

37. The apparatus of claim 24, wherein the fluid inlet directs the organic contaminant toward the photocatalyst surface.

38. The apparatus of claim 24, further comprising a metal catalyst disposed in the photocatalyst.

39. The apparatus of claim 38, wherein the metal catalyst is selected from Pt group metals, Au group metals, Ir, Ru, Sn, Os, Mo, Zr, Nb, Rh, Cu and mixtures thereof.

40. The apparatus of claim 38, wherein the metal catalyst is selected from, Pt—Sn, Pt—Mo, Pt—Ru, Ni—Zr, Pt—Rh, Pt—Ir, Pt—Ru—W, Pt—Ru—Os, Pt—Ru—Sn, Pt—Ni—Ti, Pt—Ni—Zr, Pt—Ni—Nb, Pt—Ni—Ta and mixtures thereof.

41. The apparatus of claim 38, wherein the photocatalyst comprises between about 0.01 wt % and about 5 wt % metal catalyst.

42. The apparatus of claim 38, wherein the metal catalyst is selected from platinum group metal oxides, gold group metal oxides, tin oxides, tungsten oxides, iridium oxides, rhodium oxides, ruthenium oxides and mixtures thereof.

43. The apparatus of claim 11, wherein the oxidant transmission surface is the substrate.

44. The apparatus of claim 12, wherein the oxidant is selected from ozone, hydrogen peroxide, and combinations thereof.

45. The apparatus of claim 12, wherein the oxidant is selected from ozone, hydrogen peroxide, and combinations thereof.

46. The apparatus of claim 30, wherein the oxidant is selected from ozone, hydrogen peroxide, and combinations thereof.

* * * * *